RADIO COMMUNICATION SYSTEM

Filed Oct. 21, 1950 3 Sheets-Sheet 1

INVENTORS
DIRK J. BRAAK
LOUIS F. LIERA
CORNELIS ROMEIJN
BY [signature]
AGENT

INVENTORS
DIRK J. BRAAK
LOUIS F. LIERA
CORNELIS ROMEIJN
BY Fred M. Vogel
AGENT

Dec. 4, 1956    D. J. BRAAK ET AL    2,773,176

RADIO COMMUNICATION SYSTEM

Filed Oct. 21, 1950    3 Sheets-Sheet 3

INVENTORS
DIRK J. BRAAK
LOUIS F. LIERA
CORNELIS ROMEIJN

BY Fred M Vogel
AGENT

United States Patent Office 2,773,176

Patented Dec. 4, 1956

2,773,176

RADIO COMMUNICATION SYSTEM

Dirk Johan Braak, Louis Francois Liera, and Cornelis Romeijn, Hilversum, Netherlands, assignors to Hartford National Bank and Trust Company, Hartford, Conn., as trustee Application October 21, 1950, Serial No. 191,423

Claims priority, application Netherlands October 22, 1949

5 Claims. (Cl. 250—6)

The present invention relates to a radio communication system, and more particularly to a system for communication between stationary stations, each of which comprises a transceiver arranged for intercommunication on one of different dual frequency channels, and mobile stations, each of which comprises a transceiver for intercommunication on the different dual frequency channels.

An object of the invention is to provide a simplified and improved communication system of the above type.

Another object of the invention is to provide simplified and improved transceiving apparatus for a system of the above type.

Further objects of the invention will appear from the following description.

According to the invention, a system of the aforesaid kind comprises a principal, preferably stationary station comprising a transmitter which is arranged to transmit, in its inoperative condition, a clearing signal characteristic of said condition as a modulation of its transmitting carrier frequency. The system further comprises a mobile station which is arranged to find, by variation of the tuning, a carrier frequency of a channel which is characterized by the clearing signal and subsequently to operate the transmitter. The receiver of the principal station comprises means for suppressing the transmitter clearing signal upon reception of a signal from the mobile station.

In order that the invention may be more clearly understood and readily carried into effect, it will now be described more fully with reference to the accompanying drawing, in which.

Figure 1:
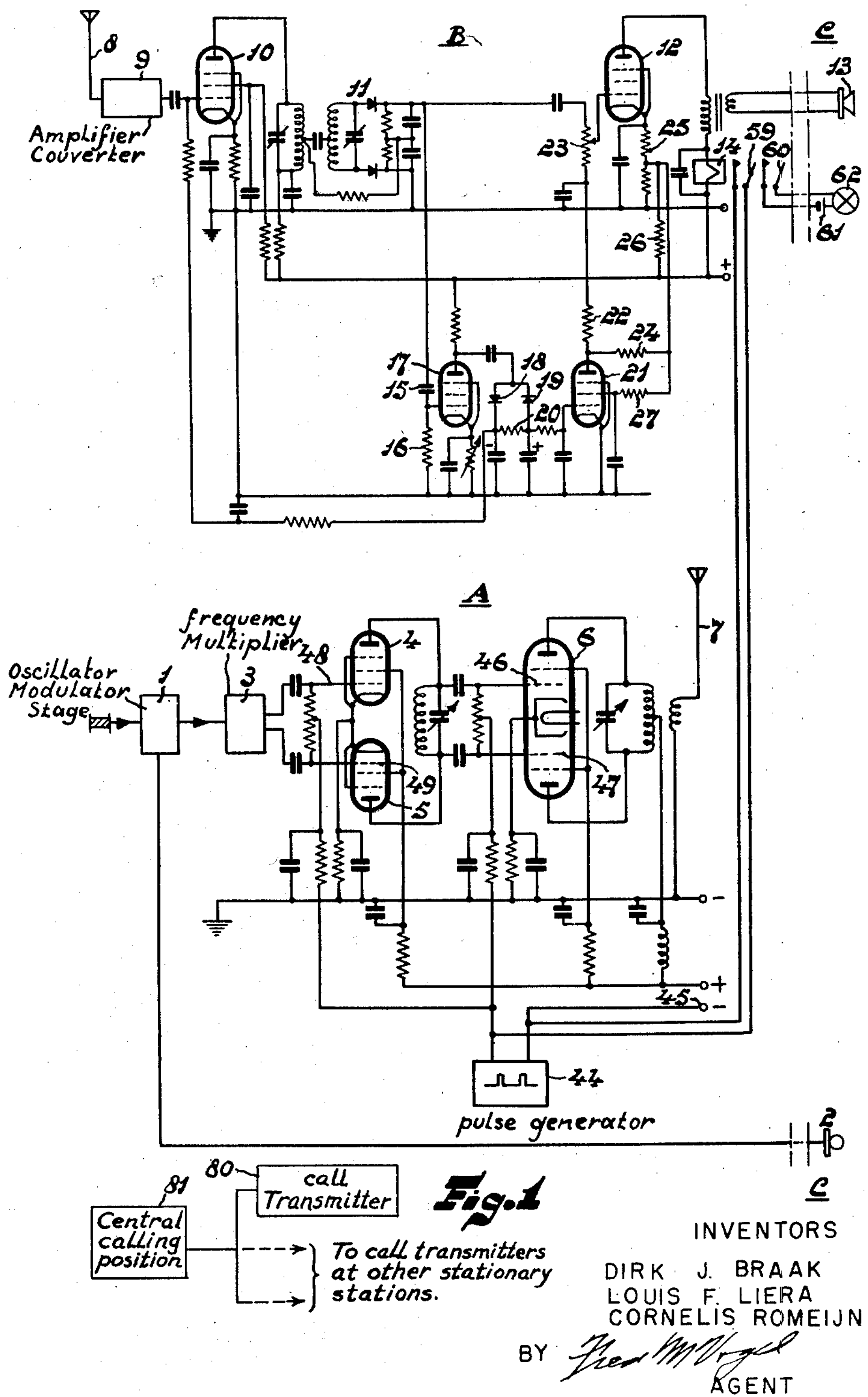
Fig. 1 is a circuit diagram of a stationary station.

Referring now to the drawing and more particularly to Fig. 1, there is shown the transceiver of a stationary station connected to a telephone exchange C. The transceiver shown is arranged for duplex communication and comprises a transmitter section A and a receiver section B. The transmitter A, which in the present case is designed for frequency-modulation, comprises a crystal-controlled oscillator-modulator stage 1 to which a microphone 2, located in the telephone exchange C, is connected. The frequency-modulated oscillations produced are supplied, after frequency-multiplication in a stage 3, to a final multiplication stage comprising two push-pull connected grid-controlled amplifying tubes 4, 5. In a preferred embodiment of the invention, a total frequency-multiplication of 96 times may be used to achieve a carrier frequency in the neighborhood of 170 mc./s. The output circuit of the tubes 4, 5 is coupled to a final amplifying stage 6 comprising push-pull connected discharge systems. The amplified high-frequency energy is radiated by an antenna 7 coupled to the output circuit of the final amplifier. The transmitter described above is of a conventional type so that a detailed description thereof is not necessary. A wide variety of transmitter arrangements may be successfully employed. When operating at very high frequencies, it is advantageous to construct the tuning circuits of the final stages as Lecher-systems.

The stationary station furthermore comprises a receiver section B having an antenna 8, which may be combined with the transmitting antenna 7 to form a common transceiving aerial. The antenna 8 is connected to a receiving device 9, the incoming signal of which is amplified in the usual manner and transposed to obtain intermediate-frequency oscillations which are supplied through a limiter 10 to a succeeding detector 11 for rectification. The rectified signal is supplied to the control-grid of a low-frequency amplifier 12, the output circuit of which includes a loudspeaker 13, located in the telephone exchange C, and a relay 14.

The dectector 11 is of conventional design and comprises a band-pass filter included in the output circuit of the limiter 10 and tuned approximately to the central intermediate-frequency. In the secondary circuit of the filter are two push-pull rectifiers, a pair of output resistances, a pair of capacitors, a condenser 15 and a leakage resistance 16. The output circuit of the detector is connected through a filter to the control-grid of an amplifying tube 17. The filter is given a cut-off frequency such that only higher frequencies of the detected noise spectrum are supplied to the tube 17, which tube serves as a noise amplifier.

The noise developed across the output circuit of the noise amplifier 17 is supplied to two oppositely connected rectifiers 18, 19 to the output circuits of which a resistance 20 is connected. The ends of resistance 20 are grounded through condensers. The voltage developed across the resistance 20 is supplied to the control-grids of the limiter tube 10 and a tube 21 respectively, by coupling each end of resistance 20 to a respective one of said control grids. Tube 21 is connected as a D. C. amplifier.

The anode of the tube 21 is connected through a resistance 22 to a leakage resistance 23, consisting of a potentiometer, to the control-grid of the low-frequency amplifying tube 12, the anode of tube 21 is also connected through a resistance 24 to a tapping of a cathode resistance 25 of the low-frequency amplifying tube 12. Resistance 25 is shunted by a condenser. The tapping thereon is furthermore connected to the positive terminal of the the anode voltage source through a resistance 26, so that the cathode operates at a definite fixed positive bias. The screen-grid voltage for the direct voltage amplifying tube 21 is also derived from the tapping of the cathode resistance 25 through a resistance 27.

When no signal is received, the noise received is supplied through the detector 11 to the noise amplifier 17 and the noise signal across the anode circuit of the tube 17 occurs, subsequent to rectification, across the resistance 20 with the polarity indicated in Fig. 1. The negative bias of the control-grid of the limiter 10 is substantially constant in the receiver owing to automatic gain control of a preceding first class limiter, independent of the incoming signals or interference. The voltage across the control-grid of tube 21 becomes more positive upon the reception of noise, due to which the low-frequency amplifier 12 is adjusted substantially to cut off. As a result, the relay 14 in the output circuit of tube 12 becomes de-energized. The function of this relay will be set out hereinafter.

Figure 2:
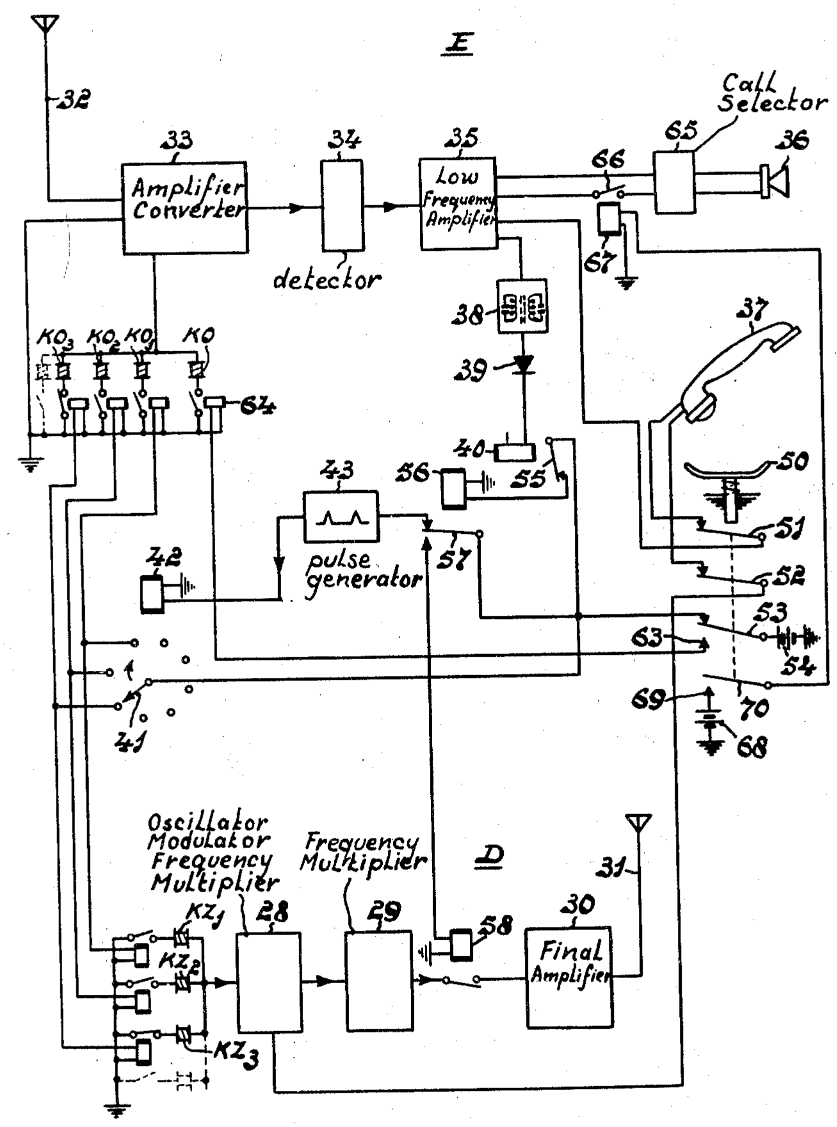
Fig. 2 is a diagram of a mobile station arranged to cooperate with a stationary station as shown in Fig. 1.

Fig. 2 shows a mobile station suitable for radio communication with a stationary station as shown in Fig. 1.

The mobile station comprises a transmitter section D and a receiver section E and is arranged for duplex communication on the various carrier frequency channels assigned to the stationary station.

The transmitter section D resembles the said transmitter section A of Fig. 1 and comprises a crystal-controlled oscillator-stage, a modulator stage and frequency-multiplication stages, jointly designated 28, an additional multiplication stage 29 and a final amplification stage 30, to which a transmitting antenna 31 is connected.

The receiver section E substantially corresponds to the receiver section B of Fig. 1 and described in connection therewith. Receiver section E comprises an antenna 32, a high frequency and intermediate frequency receiving section 33 comprising a local crystal oscillator and, if desired, a local noise suppression circuit, a detector 34 and a low-frequency amplifier 35 connected thereto. The output circuit of the low-frequency amplifier 35 includes a loudspeaker 36, the telephone of a telemicrophone 37 and a filter 38 which is tuned to a definite frequency and connected through a rectifier 39 to a relay 40, the function of which will be described hereinafter.

The transmitter and the receiver of the mobile station furthermore comprise crystals designated $KZ_1$, $KZ_2$, $KZ_3$ and $KO_1$, $KO_2$, $KO_3$ respectively, the natural frequencies of which are chosen such that the transmitting and receiving frequencies determined thereby correspond with the carrier-frequencies to which the receivers and transmitters of stationary stations used in the system according to the invention are tuned. Each crystal can be switched in by means of a switching-on relay, and the exciter coil of a receiving crystal-relay is consistently connected in series with the exciter coil of a crystal relay of a transmitting crystal relay, so that the transmitter and the receiver of a mobile station are invariably tuned simultaneously to a definite pair of carrier frequencies. The changing-over to the different pairs of carrier frequencies is effected by means of a step-by-step switch 41 and an associated relay 42 which is operated by step-pulses from a pulse generator 43.

Figure 3:
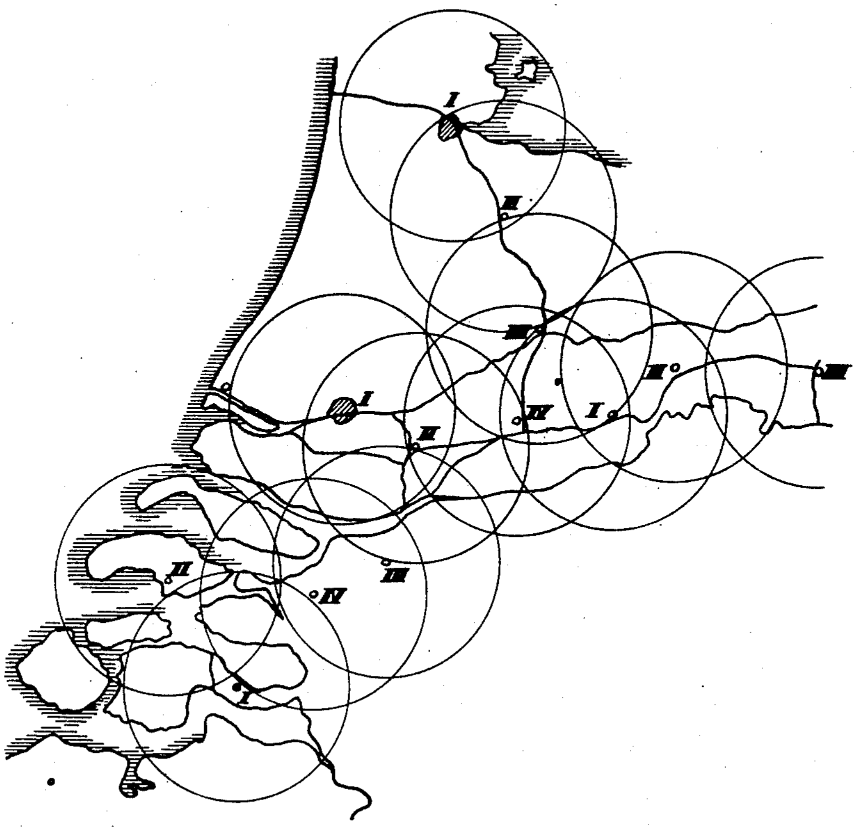
Fig. 3 shows a practical arrangement of several stationary stations in a geographical area. The stations shown are adapted for duplex communication.

Fig. 3 shows a map of the western part of the Netherlands having a busy system of waterways. In the region concerned, several fixed stationary stations, each of which comprises a transceiver arranged for two way communication on at least one of different dual carrier-frequency channels, are spaced apart from one another e. g. at relative distances of 60 kms. The circles indicate the radii of action of the stationary stations located at the centres of the circles.

As is evident from the drawing, the communication system thus created covers the desired district. It is not necessary to assign a different set of carrier frequencies to each stationary station. It is sufficient that adjacent stations operate at different frequencies so that they do not overlap. In the case of a low traffic density, a minimum of three or four different carrier-frequency pairs may suffice. These are distributed among the stationary stations so that the action radii of stationary stations with the same carrier-frequency pairs do not overlap one another. Such a distribution of the transmitting frequencies is shown in Fig. 3 by denoting the frequency pairs assigned to each station by I, II, III and IV respectively.

The stationary stations of a district may be connected in conventional manner to a telephone central office. Communication between a vehicle or vessel moving in the district concerned and one of the stationary stations in this district may be effected as follows:

According to the invention, each stationary transmitter is arranged to transmit, in its free condition, a clearing signal characteristic of this condition as a modulation of its transmitting carrier-frequency. For this purpose the stationary transmitter A of Fig. 1 comprises a device 44 from which the modulating clearing signal is taken. The device 44, which comprises a pulse generator such as a multivibrator, may be regarded as a switch operating at a low-frequency, for example 400 to 500 c./s. This switch controls application of negative bias voltage from terminal 45 to control-grids 46 and 47 of the push-pull output tube 6 and to the control-grids 48 and 49 of the final multiplication stage 4, 5.

Due to the repeated complete or substantially complete cutting-off of the amplifiers 4 to 6, the stationary transmitter is made operative at the frequency of the pulses produced by the pulse generator. Thus a substantial saving of energy taken by the transmitter from the supply means is possible. It is, of course, also possible to modulate the transmitter carrier-wave continuously with a low-frequency sinusoidal or pulse clearing signal.

If a mobile station desires communication with one of the stationary transmitters in the district shown in Fig. 3, the telemicrophone 37 in the mobile station is lifted and a multiple switch operated by the telephone hook assumes the position shown. The telephone is connected through a switch 51 to the output circuit of the receiver output stage 35, a switch 52 connecting the microphone to the transmitter modulator 28. Moreover by way of a switch 53, a voltage from a voltage source 54, is supplied to a relay 56 through a switch 55 operated by the relay 40. Upon operation of this relay, the switch 57 assumes the position shown; the step pulse-generator 43 becomes operative and the step pulses produced by this generator are supplied to the relay 42 which actuates the step switch 41. The step switch then passes, for example at a rate of approximately 30 steps a minute, various contacts successively, to each of which is connected a pair of relays switching on the crystal pairs $KO_1$—$KZ_1$, $KO_2$—$KZ_2$ and $KO_3$—$KZ_3$ and so forth. By closing a circuit: ground, voltage source 54, switch 53, step switch 41, one of the relay pairs and ground, these crystal pairs are switched on successively.

As has been stated above, the frequency pairs of the mobile transceiver determined by the said crystal pairs correspond with the carrier-frequency pairs to which the receivers and transmitters used in the system according to the invention are tuned. By turning the step switch the mobile station is consequently tuned successively to the various carrier-frequency pairs assigned to the stationary stations which, in their free condition, transmit a characteristic clearing signal. If the clearing signal transmitted by a free stationary transmitter exhibits a definite minimum amplitude on reception by the mobile receiver, which amplitude actuates the noise-suppressor circuit that may be present in the mobile receiver, the clearing signal then occurring across the output circuit of the low-frequency final amplifier 35 is supplied to the filter 38, which is tuned to the clearing signal. The signal occurring across this filter is rectified by rectifier 39 and causes the relay 40 to operate, the switch 55 to be disengaged and the relay 56 to become de-energized. The switch 57 is opened, the step pulse generator 43 is switched off, the step switch stops and the mobile station remains tuned to the carrier-frequency pair then switched on. By changing over the switch 57, a relay 58 is energized through the circuit: ground, voltage source 54, switch 53, switch 57, relay 58 and ground and the transmitter which, in the free condition, is entirely or in part inoperative to save energy, is switched on and the carrier wave is transmitted through the antenna 31.

According to the invention, the stationary stations are arranged, in such manner that, upon reception of a carrier wave transmitted by a mobile transmitter, the clearing signal transmitted in the free condition of the stationary transmitter is swiched off, so that the calling of the stationary station by another mobile station is prevented. For this purpose the receiver B is provided with the noise-suppressor circuit referred to above, which operates as follows.

On reception of a carrier wave by the receiver B of Fig. 1, the noise occurring in the receiver is not of great importance and the direct voltage which is produced owing to the normal noise across the resistance 20 and which cuts off the output amplifier tube 12, will disappear. The output amplifier tube 12 is re-adjusted to its normal condition and the anode current of tube 12 increases so that the relay 14 is energized and the switches 59 and 60 are closed. By closing the switch 59, which is connected in parallel with the pulse generator 44, the latter is short-circuited in other words the clearing signal is switched off and the carrier wave is transmitted continuously.

The switch 60 completes the circuit of a battery 61 for a signal device 62 installed in the telephone exchange C, to indicate that the junction transmitter is called by a mobile station. The operator of the mobile station no longer hears a clearing signal in the telephone, which means that his call has been received. The telephone operator then links up with the calling mobile station, in the manner used in a normal exchange, by connecting her telephone 13 to the line to the receiver of the stationary station concerned and by connecting her microphone 2 to the line to the transmitter of this stationary station. The mobile station mentions its body and the number of the stationary station of the subscriber connected to the local telephone system, whom it wants to call and the operator establishes the desired direct connection. Upon termination of the conversation, the telemicrophone (Fig. 2) is replaced on the hook 50, the switches 51 and 52 disengage the telephone and microphone of the mobile transceiver respectively, the switch 53 is changed over to a contact 63, so that the relay 58 becomes de-energized and switches off the transmitter output stage or, if necessary, the whole transmitter.

In the telephone exchange C, the end of the conversation is indicated since the noise suppressor circuit 15—27 in the stationary station, owing to the disappearance of the carrier-wave of the mobile station, again causes the grid bias of the low-frequency output tube 12 to become negative to such a degree that the relay 14 becomes de-energized. The luminous signal 62 in the exchange C is extinguished, the pulse generator 44 is re-engaged and the transmitter again transmits the clearing signal.

From the foregoing it is evident that the use of the system according to the invention, in which all the stationary stations transmit a clearing signal in their free condition, permits a moving vehicle or vessel, equipped with a mobile station, to communicate in a simple manner with a neighboring station in the range of operation of the stationary stations. The complicated system in which, for example, use is made of maps on which the particular station is indicated with which the mobile station must co-operate in accordance with its position, is thus rendered obsolete.

In order to establish a communication from a stationary station with a definite mobile station, each of the stationary stations shown in Fig. 1 is associated, according to the invention, with a separate call transmitter 80. All of the call transmitters are tuned to the same frequency, the call carrier-frequency, which deviates from the carrier-frequencies used for duplex traffic and is controlled simultaneously from a central calling position 81 to transmit one of the call signals assigned to the mobile stations. If desired, the central position may be combined with the telephone exchange C. All the call transmitters may, for example, be connected to one conductor pair of a telephone cable terminating at a central position or call exchange, from whence the calls issue.

The calls may, for example, be transmitted as a combination of tones in the low-frequency range, say below 300 c./s. which are selected at the receiver side, for example by means of resonance relays. If use is made of a combination of four tones from a total available number 11, the number of possible combinations is considerable, namely 7920. The tones may furthermore be transmitted in succession and be repeated in accordance with traffic density.

The circuit-arrangement and construction of the call transmitter may, for practical reasons, be substantially the same as those of the mobile stations and stationary transmitters.

For reception of the call signal, the receiver of the mobile station is required to be tunable not only to the said receiving carrier-frequency but also to an additional receiving carrier-frequency i. e. the calling carrier-frequency. To this end, the receiver comprises an additional crystal KO switched on by means of a relay 64 which is energized, on replacing the telemicrophone, by completing a circuit: ground, voltage scource 54, switch 53, contact 63, relay 64, and ground.

In order that each of the mobile stations may respond only to the call signal assigned to it, the receiver E (Fig. 2) comprises a call selector 65, which is connected to the output circuit of the low-frequency amplifier said selector comprising for example, resonance relays. It is to be noted that the choice of a maximum frequency of the calling tones of 300 c./s. permits the calling tones to be supplied to the various call transmitters through a pair of conductors in use in the telephone exchange.

The call selector 65 with the ringing signal device connected thereto, which is represented by a loudspeaker 36 in the drawing but may alternatively consist of a bell, a klaxon or a signal lamp, is connected to the receiver output only if the telemicrophone 37 rests on the hook. Then the call selector 65 is connected through a switch 66 to the receiver output stage 35 by energization of a relay 67 through a circuit: ground, voltage source 68, contact 69, switch 70, relay winding 67, and ground.

If a stationary station or a subscriber of the telephone system desires to call a mobile station, the subscriber concerned connects himself with the central office from which the call transmitters are controlled and mentions the number of the mobile station. The central office transmits the call signal assigned to the mobile station desired. On reception of this signal by the mobile station concerned (assuming that this station is not busy) the call selector 65 responds and the ringing signal device 36 becomes operative. The mobile subscriber lifts the telemicrophone and the step-by-step switch 41 finds a stationary station transmitting a clearing signal in the manner set out above. The disappearance of the clearing signal in the telemicrophone notifies the subscriber that his call has been received by a mobile station. The operator is notified, by the flash of the light signal 62 switched on by the noise suppressing circuit in the stationary station, that a mobile subscriber is calling. By connecting her microphone and telephone 13 to the lines to the transmitter and receiver of the stationary station selected by the mobile station, the operator established a connection with the mobile station. The mobile subscriber informs the operator that he has been called and remains on the phone. Upon information at the central office as to what subscriber has called the mobile station concerned, the operator connects the calling station directly to the mobile station, and the conversation may start.

It has been stated above, that if the intensity of traffic to be expected is low, a minimum of three or four different dual carrier-frequency channels of the stationary stations in a definite district may be sufficient. Then, as is shown in Fig. 3, over-lapping of communication ranges of stationary stations having the same carrier-frequency will not occur if the stationary stations are arranged in a suitable manner. However, such a low traffic intensity is, in general, not likely to occur throughout the traffic system, since the traffic concentrates at and around dense population centres where the traffic intensity will normally be comparatively high. Such a higher traffic intensity can be handled if several stationary stations are provided at these centres, for example two or three, which, of course, must have different carrier-frequency channels. It is obvious that the number of different carrier-frequency channels must then be increased to a number of, say 9 to 12 carrier-frequency pairs in a definite range.

The number of crystals of the transmitter and the receiver of the mobile station must then also be increased.

While the invention has been described in particular embodiments, it is not desired that it be limited thereto for obvious modifications will occur to those skilled in the art without departing from the spirit and scope of the invention.

What we claim is:

1. A radio system for communication via a plurality of dual frequency channels comprising a principal transceiver station provided with a transmitting section including means to generate a carrier wave corresponding in frequency to one frequency in one of said channels, a clearing signal generator means selectively to modulate in one condition said carrier wave in said transmitting section with an intelligence signal to be transmitted and in another condition with said clearing signal, and a receiving section including means to detect incoming noise signals and coupled to the clearing signal generator in said transmitting section to cut-off said clearing signal when the detected noise signals fall below a predetermined amplitude, said means to detect incoming noise signals comprising a rectifier, a filter connected to feed said noise signals to said rectifier and exclude other signals, and a load impedance connected to said rectifier to derive a D.-C. control voltage in accordance with said noise signals, said clearing signal generator being controlled by said control voltage, means responsive to an intercepted carrier wave whose frequency corresponds to the other frequency in said one channel to actuate the selective means in said transmitting section to transfer the same from said other condition to said one condition; a group of auxiliary transceivers each having a transmitting section including means selectively to transmit one carrier wave from a plurality of carrier waves whose frequencies correspond respectively to said other frequencies in said plurality of channels, and a receiving section including means responsive to a carrier wave modulated by said clearing signal to actuate the selective means in the transmitting section for effecting transmission on the other frequency in the channel containing said clearing signal modulated carrier wave.

2. A radio system for communication via a plurality of dual frequency channels comprising a plurality of stationary transceiver stations each provided with a transmitting section including means to generate a carrier wave corresponding in frequency to one frequency in one of said channels a clearing signal generator and means selectively to modulate in one condition the carrier wave in said transmitting section with an intelligence signal to be transmitted and in another condition with said clearing signal, a receiving section including means to detect incoming noise signals and coupled to the clearing signal generator in said transmitting section to suppress said clearing signal when the detected noise signals fall below a predetermined amplitude, said means to detect incoming noise signals comprising a rectifier, a filter connected to feed said noise signals to said rectifier and exclude other signals, and a load impedance connected to said rectifier to derive a D.-C. control voltage in accordance with said noise signals, said clearing signal generator being controlled by said control voltage, means responsive to an intercepted carrier wave whose frequency corresponds to the other frequency in said one channel to actuate the selective means in said transmitting section to transfer the same from said other condition to said one condition, and means to generate a calling wave having a frequency different from the frequencies of said carrier waves; a group of auxiliary transceivers each having a transmitting section including means selectively to transmit one carrier wave from a plurality of carrier waves whose frequencies correspond respectively to said other frequencies in said plurality of channels, and receiving section including means responsive to said calling wave and to a carrier wave modulated by said clearing signal to actuate the selective means in the transmitting section for effecting transmission on the other frequency in the channel containing said clearing signal modulated carrier wave.

3. A radio system for communication via a plurality of dual frequency channels comprising a plurality of stationary transceiver stations each provided with a transmitting section including means to generate a carrier wave corresponding in frequency to one frequency in one of said channels a clearing signal generator and means selectively to modulate in one condition the carrier wave in said transmitting sections with an intelligence signal to be transmitted and in another condition with said clearing signal, a receiving section including means to detect incoming noise signals and coupled to the clearing signal generator in said transmitting section to suppress said clearing signal when the detected noise signals fall below a predetermined amplitude, said means to detect incoming noise signals comprising a rectifier, a filter connected to feed said noise signals to said rectifier and exclude other signals, and a load impedance connected to said rectifier to derive a D.-C. control voltage in accordance with said noise signals, said clearing signal generator being controlled by said control voltage, means responsive to an intercepted carrier wave whose frequency corresponds to the other frequency in said one channel to actuate the selective means in said transmitting section to transfer the same from said other condition to said one condition, and a call transmitter for generating a calling wave having a frequency different from the frequencies of said carrier waves; a group of auxiliary transceivers each having a transmitting section including means selectively to transmit one carrier wave from a plurality of carrier waves whose frequencies correspond respectively to said other frequencies in said plurality of channels, a receiving section including means responsive to a carrier wave modulated by said clearing signal to actuate the selective means in the transmitting section for effecting transmission on the other frequency in the channel containing said clearing modulated carrier wave, a call selector responsive to one of said calling signals and a signal device actuated by said call selector; and central calling position comprising means coupled to actuate each of said call transmitter.

4. In a radio system for communication via a plurality of dual frequency channels, a principal transceiver station comprising a transmitting section including means to generate a carrier wave corresponding in frequency to one frequency in one of said channels a clearing signal generator and means selectively to modulate in one condition the carrier wave in said transmitting section with an intelligence signal to be transmitted and in another condition with said clearing signal, and a receiving section including means to detect incoming noise signals and coupled to the clearing signal generator in said transmitting section to suppress said clearing signal when the detected noise signals fall below a predetermined amplitude, said means to detect incoming noise signals comprising a rectifier, a filter connected to feed said noise signals to said rectifier and exclude other signals, and a load impedance connected to said rectifier to derive a D.-C. control voltage in accordance with said noise signals, said clearing signal generator being controlled by said control voltage, means responsive to an intercepted carrier wave whose frequency corresponds to the other frequency in said one channel to actuate the selective means in said transmitting section to transfer the same from said other condition to said one condition.

5. In a radio system for communication via a plurality of dual frequency channels, a principal transceiver station comprising a transmitting section including means to generate a carrier wave corresponding in frequency to one frequency in one of said channels, a pulsatory clearing signal generator means selectively to modulate in one condition the carrier wave in said transmitting section with an intelligence signal to be transmitted and in another condition with said pulsatory clearing signal from said generator, and means operative during said other condition to prevent generation of the carrier wave during the intervals between the pulses of said pulsatory clearing signal, and a receiving section including means to detect incoming noise signals and coupled to the clearing signal generator in said transmitting section to suppress said clearing signal when the detected noise signals fall below a predetermined amplitude, said means to detect incoming noise signals comprising a rectifier, a filter connected to feed said noise signals to said rectifier and exclude other signals, and a load impedance connected to said rectifier to derive a D.-C. control voltage in accordance with said noise signals, said clearing signal generator being controlled by said control voltage, means responsive to an intercepted carrier wave whose frequency corresponds to the other frequency in said one channel to actuate the selective means in said transmitting section to transfer same from said other condition to said one condition.

References Cited in the file of this patent

UNITED STATES PATENTS

| | | |
|---|---|---|
| 2,435,010 | Knapp et al. | Jan. 27, 1948 |
| 2,462,069 | Chatterjea et al. | Feb. 22, 1949 |
| 2,479,701 | Ress | Aug. 23, 1949 |
| 2,607,887 | Gissler et al. | Aug. 19, 1952 |